Nov. 21, 1967 R. O. HESSLER 3,353,401
METHOD AND APPARATUS FOR INDUCING FATIGUE
CRACKS IN STRUCTURAL MATERIALS
Filed Aug. 23, 1965

Richard O. Hessler INVENTOR.

BY

ATTORNEY

# United States Patent Office 3,353,401
Patented Nov. 21, 1967

3,353,401
METHOD AND APPARATUS FOR INDUCING FATIGUE CRACKS IN STRUCTURAL MATERIALS
Richard O. Hessler, Huntsville, Ala., assignor to Thiokol Chemical Corporation, Bristol, Pa., a corporation of Delaware
Filed Aug. 23, 1965, Ser. No. 481,780
4 Claims. (Cl. 73—37)

ABSTRACT OF THE DISCLOSURE

To test the integrity of structural material a localized biaxial stress field is created in the material. First and second rings are positioned in aligned relation to each other on opposite sides of the structural material and are forced into contact with the material with an opening in the first ring opposite a cavity in the second ring. When a pressurized fluid is intermittently injected into the cavity in the second ring, that portion of the structural material within the opening and the cavity in the two rings will be flexed under the force of the pressurized fluid to create a fatigue crack in the structural material. Such crack will indicate the integrity of the structural material.

---

This invention relates to a method and apparatus for inducing fatigue cracks in structural materials and more particularly to a procedure wherein a localized biaxial stress field is created in the material to produce cracks therein so that by subsequent evaluation of the material it may be determined what effect such cracks would have on the integrity of the material being tested.

In most instances where unusual stress or strain is to be applied to a material or structure, it is necessary to determine or evaluate the effects that certain defects would have on the integrity of the material. In other words, if for example the material has a weld or fabrication defect in the structure, what effect would such defect have thereon and what would be the criticalness of such a defect in the utilization of the material or structure?

At present, it is the usual practice to provide a uniaxial stress field on a material by either exacting a pulling force at diametrically opposed edges of the material or by rigidly securing one edge of the material and applying a bending force thereto. While it is well known that stresses will extend or apply in all directions from a given point, the main fields of stress in a material are usually longitudinal and transverse or circumferential, thus the present invention has for an important object thereof to induce a fatigue crack in a biaxial stress field in the material, while heretofore uniaxial stress fields have generally been applied to the material.

In manufacturing, for example, pressure vessels, one of the inspections that are carried out in determining the integrity of the vessel is the utilization of an X-ray apparatus. If a defect was detected in the vessel, a pressurized fluid was injected into the vessel to determine the detrimental effect such a defect would have on the vessel. If there were no other defects present in the vessel, a thorough study of this defect could be carried out, but if an unknown defect were present in the vessel, such unknown defect may cause rupturing of the vessel at a point other than the point of location of the known defect and thus destroy the evaluation of the known defect.

With the present invention the stress field can be localized about the defect and the vessel can be tested at such area without placing any undue stress on other areas of the vessel. Thus one area of the vessel could be tested without such test effecting, in any manner, the remainder of the vessel.

Thus while inducing cracks from known defects in pressure vessels, by pressurizing the entire vessel, other unknown defects might cause cracks in the vessel, due to minute stress concentration or unknown defects inherent in the material fabrication process or design, that might destroy the vessel before proper evaluation of the known defect.

It is another object of the invention, therefore, to provide a procedure whereby a localized stress field is produced in a pressure vessel so that specific areas of the vessel may be tested without inducing strain or possible destruction on the other areas of the vessel.

It is a further object of the invention to provide a procedure that can produce a localized biaxial stress field in a sample piece of material or in a completely fabricated pressure vessel.

The material to be tested may vary in many dimensions and shapes and the radius of curvature thereof and its thickness may be determined, but in final analysis it is the geometry of the material that will determine the application of the procedure embodying the instant invention.

It is believed that the above and other objects and advantages will become apparent from a consideration of the following detailed description when taken in conjunction with the accompanying drawing, in which.

Figure 1:
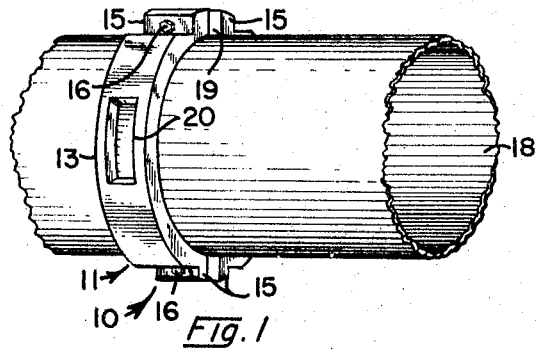
FIGURE 1 is a perspective view, partly broken away, illustrating the application of the apparatus embodying the invention to a portion of a pressure vessel.

Referring more in detail to the drawing, wherein like parts are designated by like reference numerals, the reference numeral 10 is used to generally designate the apparatus embodying the invention, which comprises an outer ring 11 and an inner ring 12.

The outer ring 11 includes a pair of half sections 13 and 14 which may be any suitable size or shape but as illustrated, they are shown as to conforming to or comprising sections shaped as half circles or semi-circular in configuration.

Figure 2:
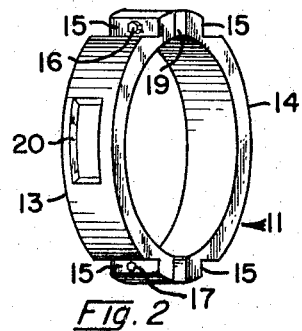
FIGURE 2 is a perspective view of the outer ring member of the apparatus.
Figure 3:
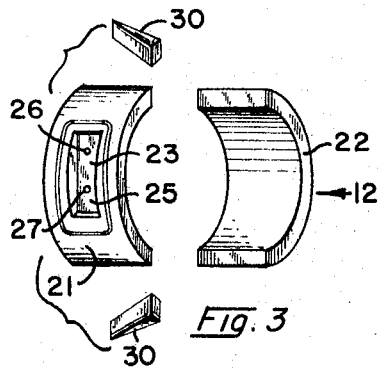
FIGURE 3 is an exploded perspective view of the inner ring member.

Each end of the half sections 13 and 14 have a flange 15 integral therewith which extend outwardly thereof at right angles thereto and bolts 16 extending through alined openings 17 in the flanges 15, rigidly secure the outer ring 11 on a pressure vessel 18, as shown in FIGURE 1. Due to fabrication problems it may be found necessary to vary the circumferential area of the outer ring 11, and under such circumstances shims 19 may be interposed between the flanges 15, as shown in FIGURES 1 and 2. However, in most instances it will not be necessary to employ such shims. Half section 13 of the outer ring 11 is provided with an opening 20, which may be square or of rectangular formation depending on the size of the area that is to be stressed and later evaluated.

The inner ring 12 also includes a pair of half sections 21 and 22 which are similar in shape to the half sections 13 and 14 of the outer ring 11, but there is a difference in size because the half sections 13 and 14 engage the outer circumferential surface area of the vessel 18, while the half sections 21 and 22 engage the inner circumferential area of the vessel 18. Half section 21 of the inner ring 12 is provided with a cavity 23, having sides 24, the size and shape of which will conform to the opening 20 in the half section 13 of the outer ring 11 and its depth will depend upon the provision of a sufficient flow area for the application of the necessary pressure that is required to carry out the invention.

Figure 4:
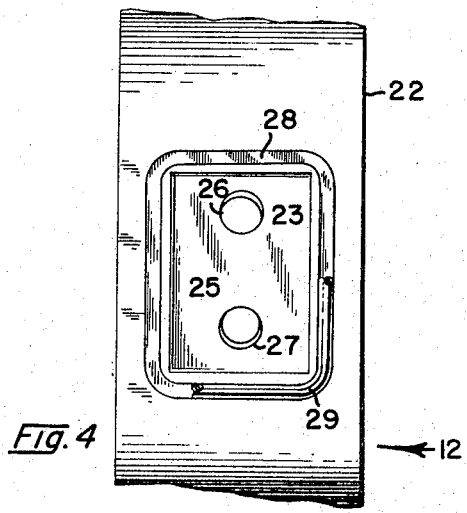
FIGURE 4 is an elevational view partly broken away and enlarged to more clearly illustrate the cavity formation in the inner ring of FIGURE 3.

The bottom 25 of the cavity 23 is provided with a pair of spaced ports 26 and 27 for a purpose to be later described. An annular groove 28 surrounds and outlines the cavity 23 and a sealing gasket 29 is positioned within the groove 28, as shown in FIGURE 4.

In some instances, the mouth or access opening of the pressure vessel 18 is smaller than the overall diameter thereof and the half sections 21 and 22 are so formed that they may be individually inserted through the mouth of the pressure vessel 18 to be positioned therein in contact with the inner circumferential area of the pressure vessel 18. It is also conceivable that the inner ring 12 may comprise more than two sections depending upon the size of the mouth or access opening of the pressure vessel. Since it is necessary that the inner ring 12 closely contact the inner circumferential surface of the pressure vessel 18, a jack is positioned within the half sections 21 and 22 to force these sections into intimate contact with the inner circumferential surface of the pressure vessel 18 and to retain these sections in close intimate contact therewith, shims or wedges 30 are placed between the end edges of the half sections 21 and 22, as shown in FIGURE 5.

Figure 5:
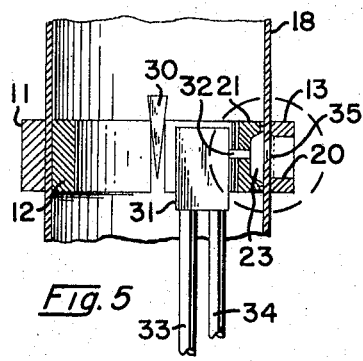
FIGURE 5 is a detailed fragmentary sectional view partly broken away to more clearly illustrate the application of the inner and outer rings to the pressure vessel.
Figure 6:
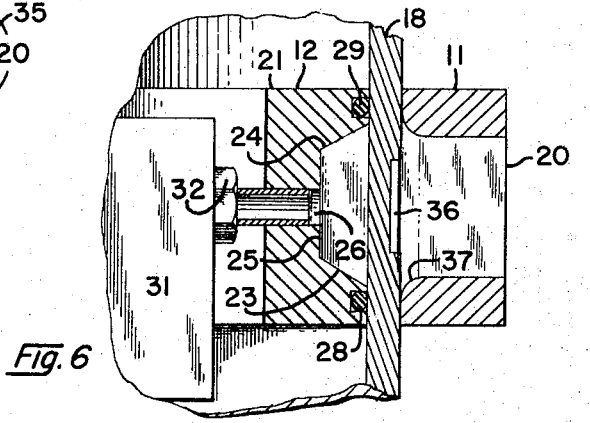
FIGURE 6 is an enlarged detailed fragmentary sectional view, partly broken away, of that portion of FIGURE 5 included in the area within the dotted circle 6.

To complete the apparatus 10 a conventional three way two position valve and control assembly 31 is connected to the ports 26 and 27 in the cavity 23 by means of connections or nipples 32, as shown in FIGURE 6 and inlet and outlet sources 33 and 34 for a pressurized fluid are connected to the valve and control assembly 31, as shown in FIGURE 5.

The present invention is provided to solve a well known problem, i.e., what effect do defects have on structural material and/or pressure vessels and what is the impairment such defects have on the integrity of the structural material and/or the pressure vessel.

The employment of the apparatus embodying the instant invention and its manner of use is originated by first inducing in the material or the wall of the pressure vessel a machined starter notch such as shown at 35 in FIGURE 5 and in greatly exaggerated form as shown at 36 in FIGURE 6. However, the definite size of such induced starter notches depends largely from the type of evaluation and test that is to be carried out later.

By the use of the apparatus a fatigue crack or other detrimental results are obtained from the starter notch and such results will determine through the medium of later evaluation the effect such defects will have on the integrity of the structural material and/or the pressure vessel.

After the starter notch has been formed in the material to be tested, in the case of a pressure vessel the half sections 21 and 22 of the inner ring 12 are inserted into the pressure vessel 18 through the mouth thereof, a jacket is positioned between the half sections 21 and 22 and they are moved into intimate contact with the inner surface of the wall of the pressure vessel 18. Then shims or wedges 30 are placed between the ends of the half sections 21 and 22, as shown in FIGURE 5, to maintain the inner ring 12 in the position to which it has been moved by the jack.

The cavity 23 is positioned so that it is concentric with the area in which the starter notch 35 is located. The gasket 29 provides a pressure seal between the inner ring 12 and the interior wall of the pressure vessel 18 to prevent loss of a pressurized fluid that is later injected into the cavity 23.

The outer ring 11 is then positioned on the pressure vessel 18 in intimate contact with the surface of the outer wall of the pressure vessel 18 and is rigidly secured in place by means of the bolts 16, as previously described, shims 19 may be used if found to be necessary to obtain the intimate contact that is required.

The opening 20 is alined with the cavity 23 in the inner ring 11 and the size of the area to be tested is determined by the size of the opening 20 and the cavity 23. If found to be necessary a conventional alinement fixture is used to maintain perfect alinement of the inner and outer rings 11 and 12. In the case of sample sheets of material, flat members having view ports and openings therein are clamped directly to the sample sheets on opposite sides thereof.

The valve and control assembly 31 is then connected by couplings 32 to the ports 26 and 27 that communicate with the cavity 23 and the apparatus is ready for testing purposes.

A pressure fluid is then injected into the cavity 23 intermittently through the medium of the valve and control assembly 31. The effect of the intermittent application of the pressurized fluid to the material being tested, so that the pressure is applied and then released by means of inlet and outlet sources 32 and 33, causes that portion of the material outlined by the cavity 23 and the view port or opening 20 to function by reason of its inherent resiliency as a diaphragm so that as the pressure is applied and withdrawn, there will be a slight bending and stressing effect depending on the thickness of the material being tested, the curvature of the surface thereof, and the shape and size of the opening 20 and the radius at the inner edge thereof.

The inner edge of the opening 20 is provided with radii 37, as shown in FIGURE 6 to avoid stress concentration at this point and permit slight flexing of the material to be tested. The degree of edge restraint on that portion of the material that functions as a diaphragm will then be determined by the radius on the inner edge of the opening 20 where it contacts the material. Thus the outer ring 11 is intimately clamped about the pressure vessel 18 to shape the area which functions as a diaphragm and to provide an extension of the clamped area to the diaphragm area.

A predetermined known pressure is then injected into the cavity 23 and such pressure will be intermittently applied until repeated intermittent application of such pressure will cause the fatigue crack to start.

On the other hand, if a known defect is found in the material, the same procedure may be followed, using the known defect for the test instead of the induced notch 35.

Thus by localizing the stress field, as previously described, that area of the material in which the defect is located or the crack is induced can be thoroughly tested without applying a stress field to the remainder of the material and/or the pressure vessel.

It is believed that from the foregoing description the apparatus, as well as its manner of application, will be understood by those skilled in the art and it is to be understood that variations or changes in the apparatus or its manner of use are permissible providing said variations or changes fall within the spirit of the invention and the scope of the appended claims.

Having thus described the invention what is claimed as new and desired to be secured by Letters Patent is:

1. An apparatus for inducing fatigue cracks in a pressure vessel comprising first and second members that are positioned on opposite surfaces of the pressure vessel in alined relation to each other, said first member having an opening therein, said second member having a cavity therein that is alined with the opening in said first member, said first and second members conforming in shape to the configuration of said pressure vessel and each of said members comprise a plurality of sections of similar configuration, means engaging said sections for retaining the sections of each of said members in rigid relation to each other, and means for intermittently injecting a pressurized fluid into said cavity whereby that portion of the pressure vessel interposed between said first and second members is flexed under the force of the pressurized fluid.

2. An apparatus for inducing a biaxial stress field in a pressure vessel comprising inner and outer sectional rings having means cooperating therewith to retain the sections of each of said rings in fixed relation to each other, said inner ring having a cavity therein provided with inlet and outlet ports, said outer ring having an opening therein, and means connected to the ports in said cavity for injecting an intermittently pressurized fluid into said cavity.

3. An apparatus as in claim 2, wherein the inner annular edge of the opening in said outer ring is provided with a radius to prevent stress concentration in the pressure vessel about said opening.

4. A method for inducing fatigue cracks in a structural material comprising providing a starter notch in the material, positioning a first member having a cavity therein on one side of the material in alinement with the starter notch, positioning a second member having an opening therein on the opposite side of the material in alinement with said first member and intermittently injecting a pressurized fluid into the cavity in said first member to cause said pressurized fluid to flex that portion of the material concentric to the starter notch until the starter notch produces a fatigue crack.

References Cited
UNITED STATES PATENTS

| | | | |
|---|---|---|---|
| 2,194,914 | 3/1940 | Ruch | 73—91 XR |
| 2,826,063 | 3/1958 | Astley | 73—102 |

LOUIS R. PRINCE, *Primary Examiner.*

WILLIAM HENRY, *Assistant Examiner.*